F. S. KOCHENDORFER.
GRINDING, POLISHING, AND BUFFING MACHINE EQUIPMENT.
APPLICATION FILED NOV. 11, 1916. RENEWED MAR. 16, 1920.
1,339,202.
Patented May 4, 1920.
8 SHEETS—SHEET 2.
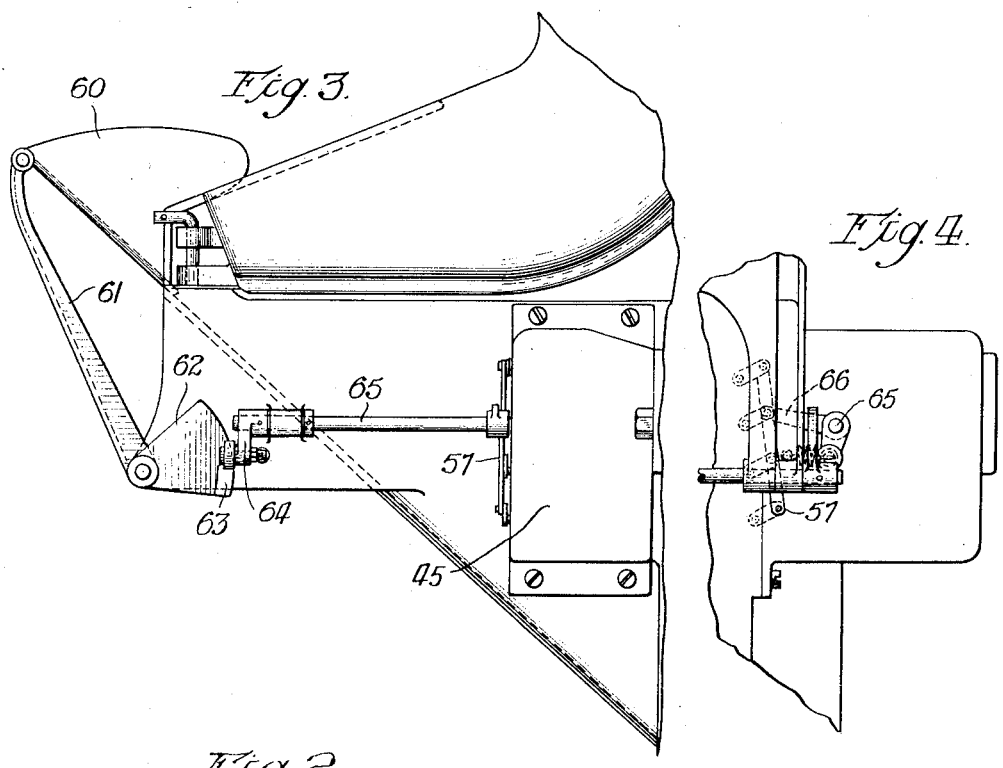
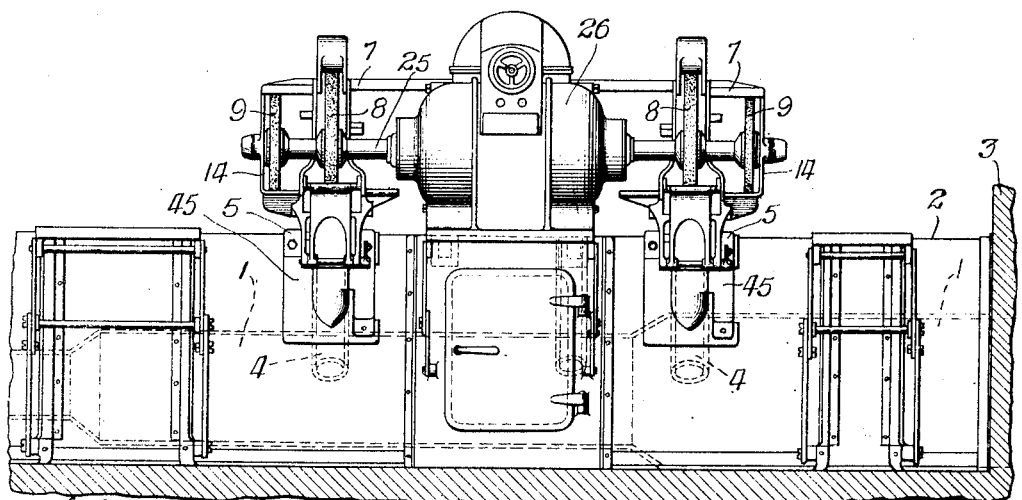

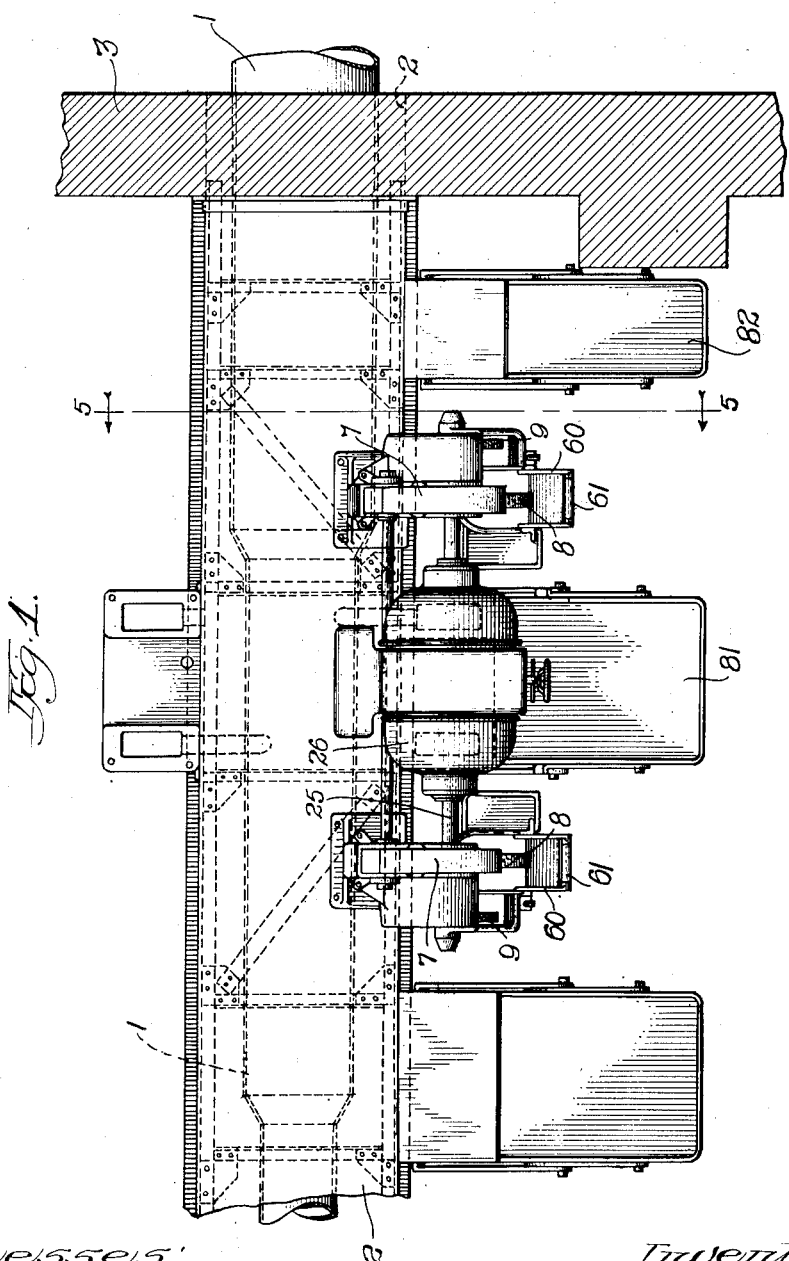

F. S. KOCHENDORFER.
GRINDING, POLISHING, AND BUFFING MACHINE EQUIPMENT.
APPLICATION FILED NOV. 11, 1916. RENEWED MAR. 16, 1920.
1,339,202.
Patented May 4, 1920.
8 SHEETS—SHEET 3.
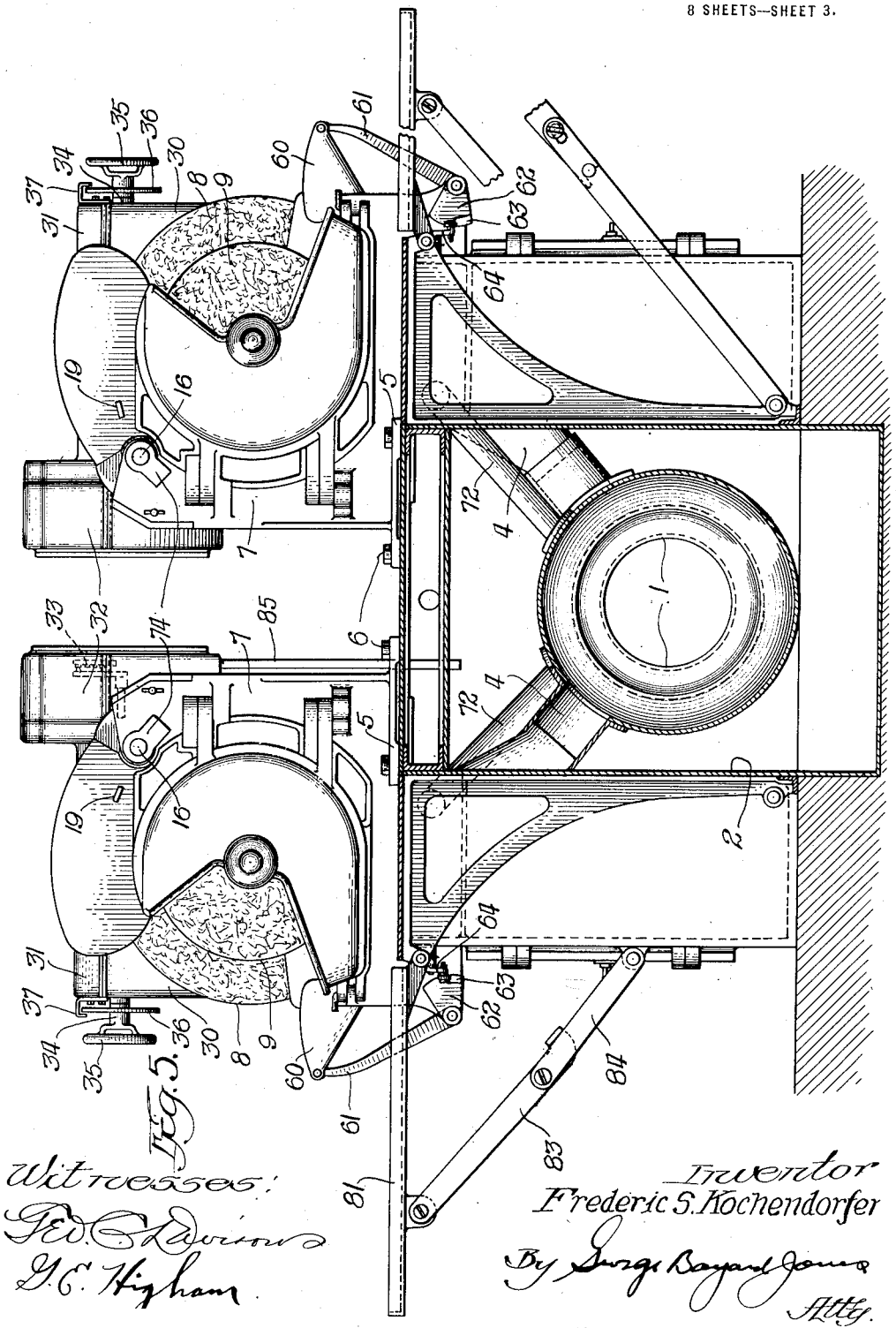

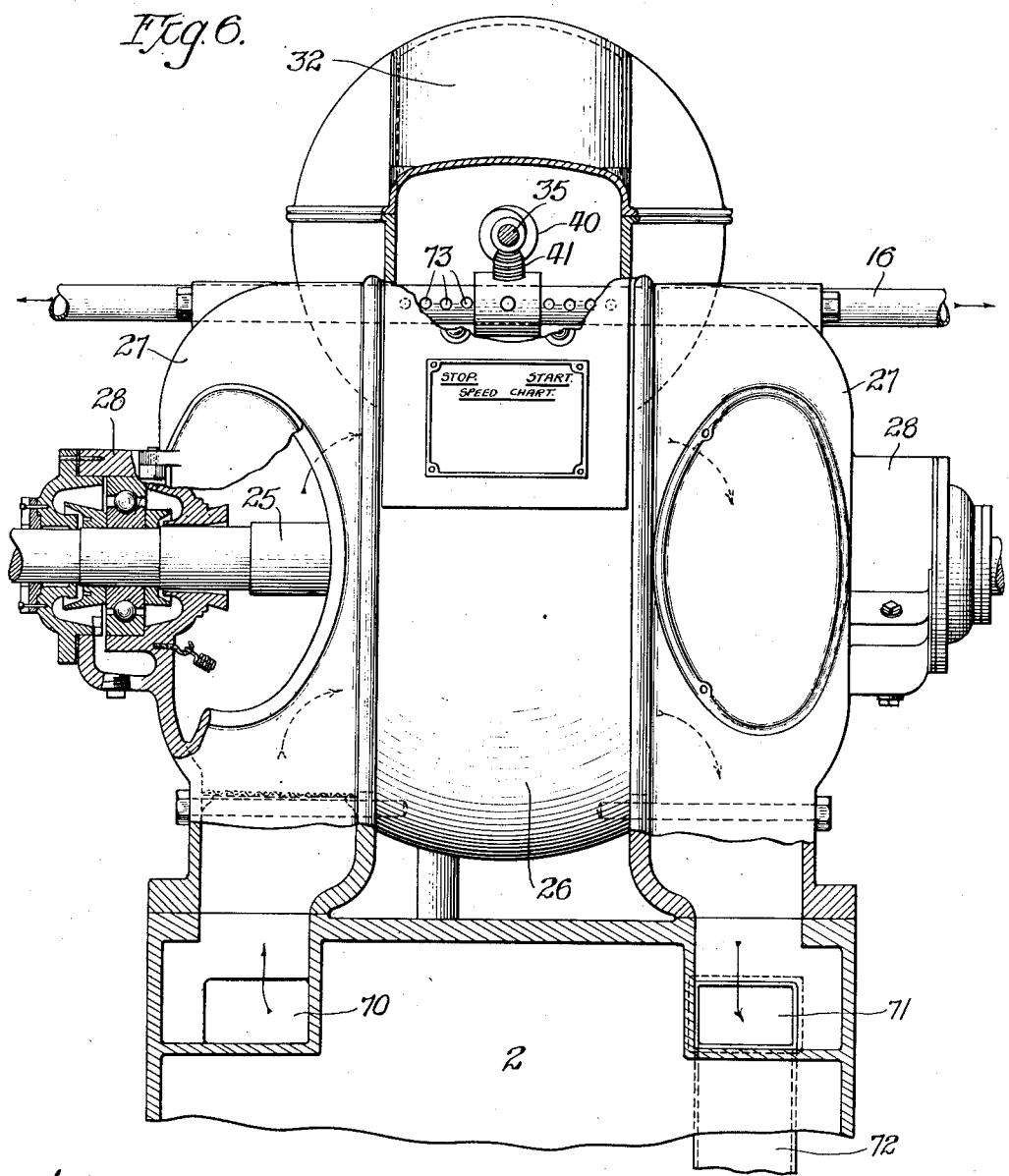

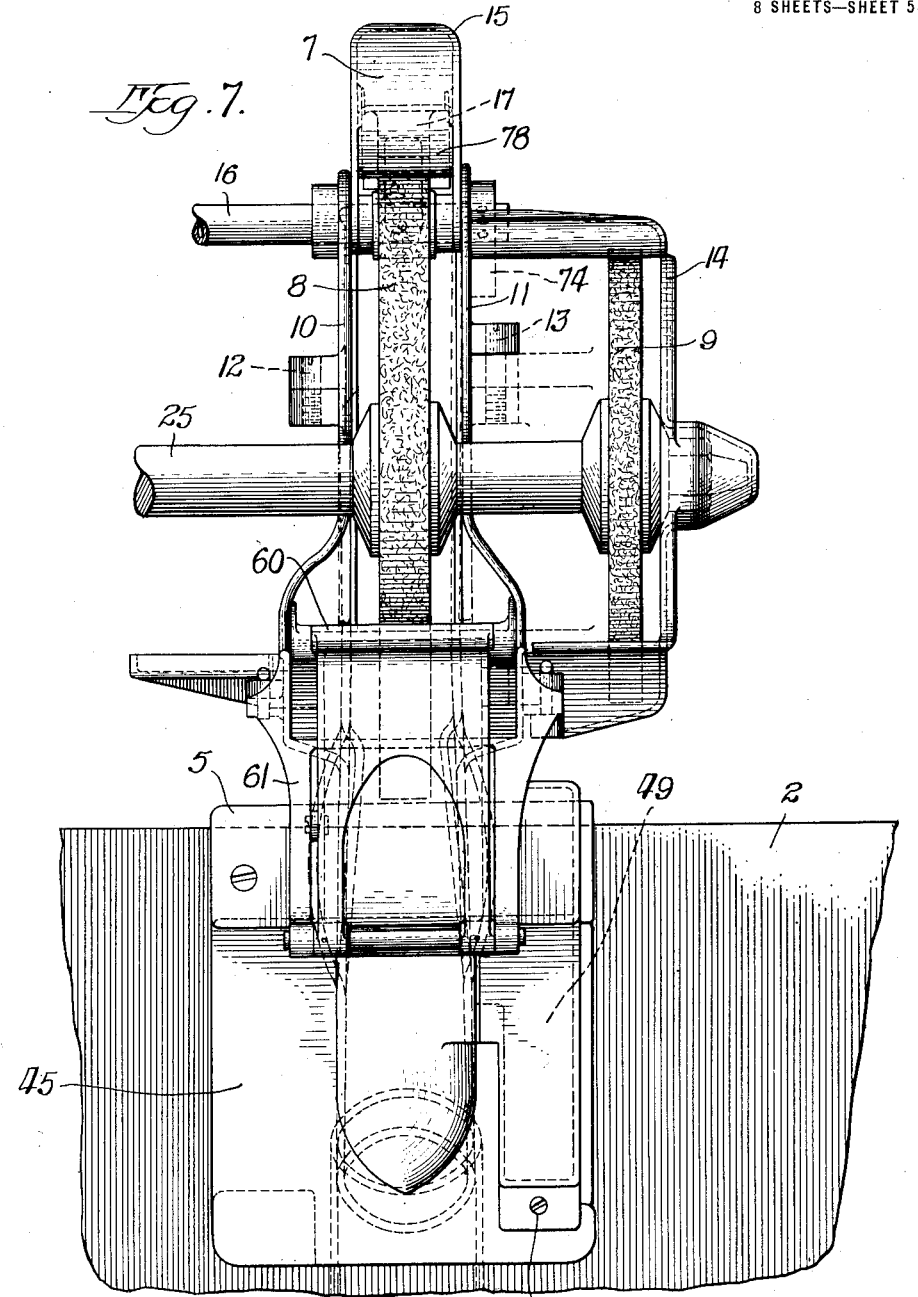

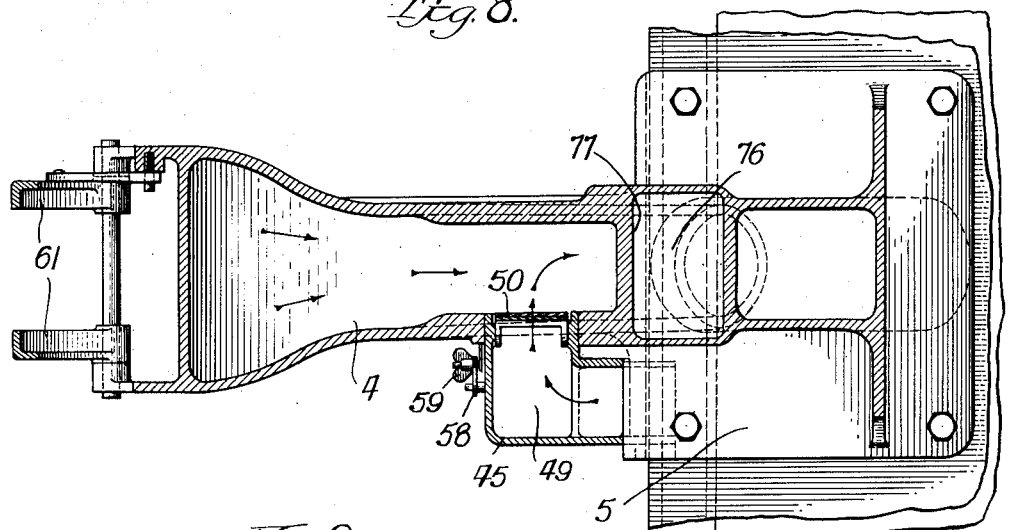

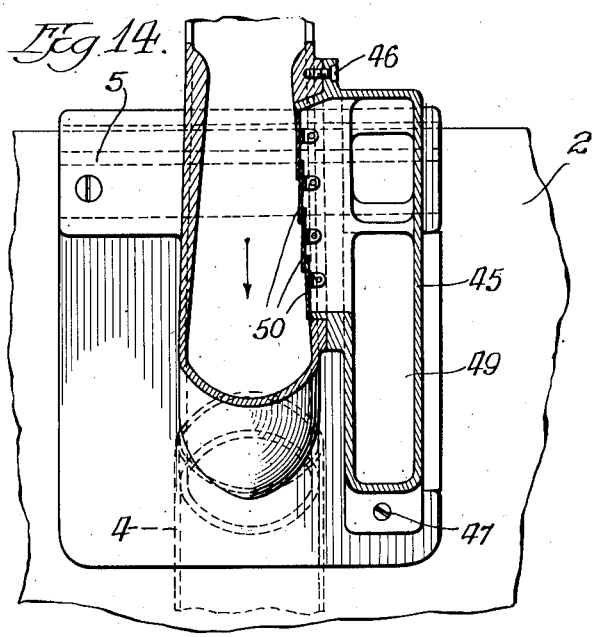
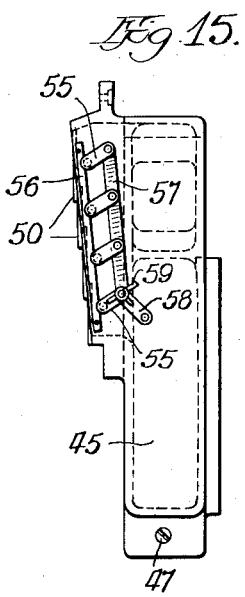
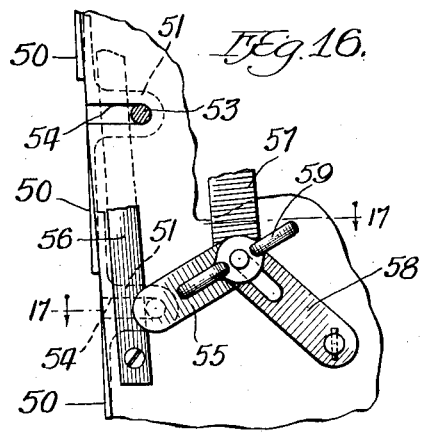
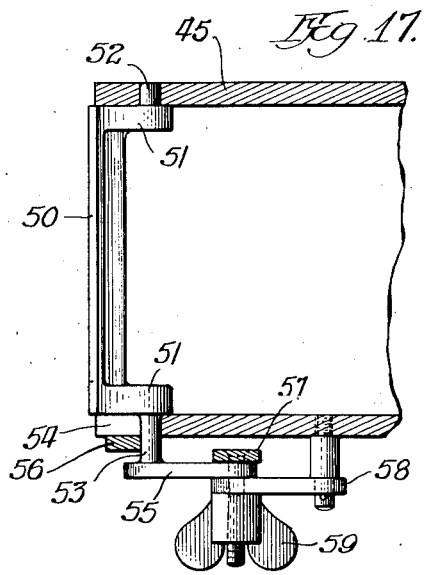

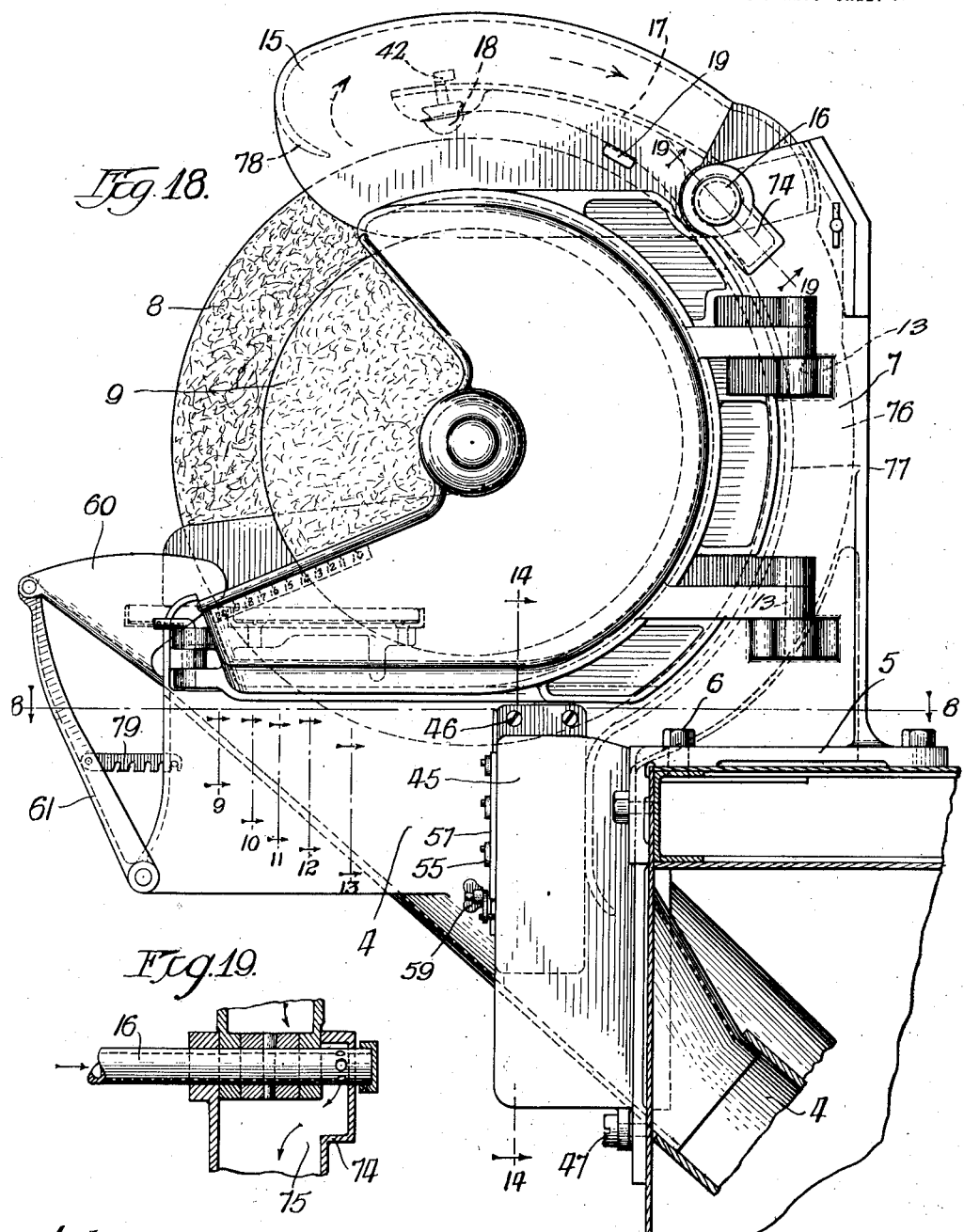

UNITED STATES PATENT OFFICE.

FREDERIC S. KOCHENDORFER, OF CHICAGO, ILLINOIS, ASSIGNOR TO WESTERN ELECTRIC COMPANY, INCORPORATED, OF NEW YORK, N. Y., A CORPORATION OF NEW YORK.

GRINDING, POLISHING, AND BUFFING MACHINE EQUIPMENT.

1,339,202.     Specification of Letters Patent.     Patented May 4, 1920.

Application filed November 11, 1916, Serial No. 130,750. Renewed March 16, 1920. Serial No. 367,127.

*To all whom it may concern:*

Be it known that I, FREDERIC S. KOCHENDORFER, a citizen of the United States, residing at Chicago, in the county of Cook and State of Illinois, have invented certain new and useful Improvements in Grinding, Polishing, and Buffing Machine Equipments, of which the following is a full, clear, concise, and exact description.

This invention relates to grinding, polishing, and buffing machine equipment.

The more important objects of the invention are to provide means for removing the dust laden air more effectively than heretofore, to prevent the withdrawal of an unnecessary amount of artificially heated air from the work shop in cold weather, and to provide an improved variable speed polishing equipment of this character whereby the same may be operated at its maximum efficiency. Other objects and advantages may be inferred from the following description of the preferred embodiment of the invention, which is illustrated in the accompanying drawings.

Figure 1 is a top plan view of a duplex polishing and buffing equipment.

Fig. 2 is a front elevation thereof.

Fig. 3 is an enlarged side elevation of an automatic control for the exhaust.

Fig. 4 is a front elevation of a portion thereof.

Fig. 5 is a section on the line 5—5 of Fig. 1, showing two sets of said duplex equipments.

Fig. 6 is a front elevation of the driving motor, certain parts being shown in section.

Fig. 7 is an enlarged front elevation of a pair of polishing wheels.

Fig. 8 is a section on the line 8—8 of Fig. 18.

Fig. 9 is a section on the line 9—9 of Fig. 18.

Fig. 10 is a section on the line 10—10 of Fig. 18.

Fig. 11 is a section on the line 11—11 of Fig. 18.

Fig. 12 is a section on the line 12—12 of Fig. 18.

Fig. 13 is a section on the line 13—13 of Fig. 18.

Fig. 14 is a section on the line 14—14 of Fig. 18.

Fig. 15 is a front view of a portion of the apparatus shown in Fig. 14.

Fig. 16 is an enlarged view of certain details shown in Fig. 15.

Fig. 17 is a section on the line 17—17 of Fig. 16.

Fig. 18 is an enlarged side elevation of a single polishing outfit having certain modified adjuncts.

Fig. 19 is a section on the line 19—19 of Fig. 18.

An exhaust pipe 1 is located within an air inlet duct 2, (Figs. 1, 2, and 5) both ducts passing through the wall 3 of the building. The larger duct communicates with the outer air. The smaller duct communicates with a suitable exhaust blower, not shown, and becomes of successively smaller diameters at intervals, as shown in Figs. 1, 2, and 5, to equalize the air drawn from successive groups of grinding, buffing, and polishing wheels located along said ducts. Communication to said exhaust pipe 1 from the polishing wheels is made through diagonally arranged branch ducts 4, each of which leads from and forms part of a supporting base 5 secured to the rectangular outer duct 2 by suitable cap screws 6 (Fig. 5). On each base is a suitable hood, indicated generally by 7, constituting a housing for a large polishing wheel 8 and a smaller buffing wheel 9. The dust laden air within the hood and adjacent to the exposed parts of the wheels is thus drawn down into the exhaust pipe and discharged.

The large wheel is inclosed between side walls 10—11, which are pivoted respectively on the pins 12—13, whereby they may be swung back to permit access to said wheel, where the part being held against said wheel is of such configuration as to interfere with said walls. These walls serve to limit the space around the larger of the two wheels and thus insure a high velocity of the entering air. A cylindrical extension 14 is also hinged to the same pins 13 and incloses the smaller wheel 9. The top member 15 of the hood is pivoted about a tubular shaft 16 and has an arm or partition 17 therein secured to said shaft to turn therewith and provided with a stop 18 at the end thereof which may engage the wheel to limit the adjustment of said partition. The swinging movement of the top is limited by the lug 19 on the downward movement (Fig. 18).

The two polishing wheels are removably mounted on a suitable shaft 25 constituting also the shaft of the driving motor 26 (Fig. 6). The side frame 27 of the motor is so arranged that an air current may be drawn therethrough for cooling purposes, as hereinafter described. The side walls of the motor housing have lateral extensions 28 constituting bearings for the motor shaft.

On top of the motor a box like structure 30 is mounted, having a removable cover 31 (Fig. 5). The rear is enlarged to form a suitable housing 32 containing a rheostat 33. The rheostat resistance is in series with the motor fields, the latter being preferably shunt wound and serves to control the speed of the motor and of the polishing wheels. Said rheostat may be of standard construction and need not be described in detail. It is provided with an operating shaft 34, the latter being rotated by the operator by means of a hand wheel 35 at the forward end thereof. A dial 36 is also mounted on said shaft and serves in conjunction with a stationary pointer 37 to indicate speed values to the operator, as hereinafter explained. A worm 40 (Fig. 6) mounted on the shaft 35 engages a gear sector 41 on the shaft 16, whereby as the operator rotates the hand wheel to cut out resistance from the motor field to speed up the armature, the shaft 16 is rotated, and hence the partition 17 over the large polishing wheel is swung downwardly until the stop 18 thereof almost engages the periphery of the rotating wheel. The parts are so designed that proper speed of rotation for a wheel of given diameter is attained just prior to the engagement of the stop 18 with said wheel, at which time the value of the resistance in the motor field circuit is just sufficient to insure said predetermined speed, the value of which is indicated to the operator by the disk 37 and pointer 38. The stop 18 in conjunction with the polishing wheel is therefore made to operate as a safety device, whereby the operator cannot run said wheel at too high a surface speed.

The pivoted partition 17 is engaged by a lug 42 on the inside of the pivoted top 15 of the hood and supports the latter, thereby maintaining the said partition at a substantially uniform distance from the top wall of said member.

During the normal operation of the system all of the air drawn down the branch ducts 4 passes over or near the polishing wheels. Since these wheels are necessarily left running at intervals when they are not actually being used, however, it is desirable to prevent drawing more air from the room than is actually necessary. This is particularly important in cold weather where the building in which the work is being carried on is artificially heated and where the continuous withdrawal of warm air, whether the machines were being used or not, would result in considerable waste of heating fuel. It is desirable, however, to maintain substantially uniform flow through the exhaust pipe, and in fact, a certain minimum is called for under some factory requirements. To increase the efficiency of the system, therefore, means are provided for drawing in outside air and by-passing it into the exhaust pipe.

The by-pass attachment 45 (Figs. 2, 14, and 15) has the form of a separate casting secured to the adjacent parts by suitable screws 46, 47. One side communicates through an opening 49 with the rectangular inlet duct 2, which communicates with the outer air. The flow of fresh air from the chamber within the by-pass 45 is controlled by shutters 50, which shutters may be closed when the wheels are used for polishing, and may be open more or less at other times to supply the necessary volume of air to the exhaust duct 4 to maintain the minimum requirements. Each shutter is provided with an arm 51 at opposite ends, one of which has a pin 52 constituting a pivot, the other having an alined pin 53 constituting another pivot for the shutter and passing through a slot 54 in the wall of the chamber, with an arm 55 secured thereto. The various pins 53 are held in the slots by a locking bar 56, as shown in Figs. 15, 16, and 17. The respective arms 55 are secured to a link 57 at the lower end of which a slotted arm 58 is arranged whereby the link 57 may be readily moved up and down and secured in any position of adjustment by means of a wing nut 59. The by-pass may be operated automatically by the device shown in Fig. 3. The operator holds the piece which he is grinding against the polishing wheel and leans against an apron 60, which is pivoted to a link 61, the latter being arranged to turn with a sector 62 having a cam surface 63. An arm 64 is thereby rocked, turning a shaft 65 which latter is connected by an arm 66 to the link 57 shown in Fig. 4, whereby the shutters are automatically closed as the operator presses the work piece against the polishing wheels. The apron projects far enough to compel the operator to lean against it in order to conveniently hold the work against the wheel.

The suction in the exhaust pipe is used also to draw air through the motor and through the rheostat to cool them. As shown in Fig. 6, the chamber at one side of the motor communicates through the opening 70 with the cold air duct 2. The air flows in the direction indicated by the arrows, being drawn out through an opening 71 at the lower part of the chamber on the opposite side and through a duct 72 to the exhaust pipe 1. Air is also drawn in through a pipe 85 (Fig. 5), the rheostat 33 and through the housing 30 on top of the motor, passing into the tube 16 through suitable openings 73 therein (Fig. 6), and being drawn toward the opposite ends of said tube, discharging into a rectangular cap 74 on each end thereof (Fig. 19), which communicate through an opening 75 with a curved passageway 76 formed between the rear wall of the hood 7 and a partition 77 which conforms closely to the outline of the larger polishing wheel. Some of the air flowing downwardly past the wheel into the duct 4 is carried around by the periphery of the wheel, a portion of it being caught at the extremity of the pivoted top 15 by the deflector 78, as shown by the arrows in Fig. 18, and all of the curved passageway 76 being under suction, said air is drawn downwardly through said arc shaped passageway to the exhaust duct 4. To this current is added the air drawn over the rheostat and passageway through the end of the pipe 16. The lug 42 which rests on the partition 17 serves to maintain the opening between the end of the deflector 78 and the periphery of the wheel 8 at a minimum to prevent the suction within the arc shaped passageway from being rendered ineffective. It also serves to maintain said passageway between said partition and the upper wall of the pivoted part of the hood. Otherwise said top would swing downwardly and rest on said partition, thereby cutting off said passageway.

Instead of the automatic arrangement for controlling the by-pass the construction shown in Fig. 18 may be employed in which the apron 60 is pivoted to the link 61 as before, the latter, however, having a notched link 79 pivoted thereto whereby said apron may be adjusted with respect to the adjacent polishing wheel.

Various work tables 81, 82 are provided on which the pieces being polished may be stored before and after the polishing operation. Said tables are preferably hinged, as shown in Fig. 5, and supported by a pair of links 83, 84, whereby they may be conveniently swung down out of the way when not in use.

What is claimed is:

1. The combination with a polishing wheel having an adjustable hood with an opening therein, of an exhaust duct communicating with said hood, and means for adjusting said hood to maintain a substantially uniform exhaust for all diameters of wheels.

2. In a device of the class described, a polishing wheel, a hood therefor, an exhaust duct communicating with said wheel, the top of said hood being pivoted to permit adjustment as said wheel wears away, and a partition in said adjustable top providing a passage way communicating with said duct for drawing off air carried around by said wheel.

3. In a device of the class described, a polishing wheel, a hood therefor, a tubular member on which the top of said hood is pivoted, a duct communicating with the base of said polishing wheel, and a passageway in said hood communicating with said tubular member whereby air may be drawn through the latter into said duct.

4. The combination with a motor, of a rheostat mounted adjacent thereto, a polishing wheel on the motor shaft, a hood for said wheel having a pivoted top, a tubular member on which said top is mounted, a rod for adjusting said rheostat, connections between said rod and said tube whereby the latter turns with the former, an exhaust duct communicating with said wheel, and a passageway from said tube to said exhaust duct whereby air may be drawn through said rheostat and discharged into said duct.

5. The combination with a fresh air duct, of an exhaust duct inclosed thereby, a motor mounted on said fresh air duct, and having a passageway whereby the interior of the motor housing communicates with said fresh air duct, a second passageway leading from said interior to said exhaust duct, a polishing wheel driven by said motor, and a further passageway from said wheel to said exhaust duct for drawing off the dust resulting from the polishing operation.

6. In a device of the class described, a polishing wheel, a hood therefor, an exhaust duct, connections therefrom to said polishing wheel, and a by-pass communicating with a fresh air supply for varying the amount of air drawn from the vicinity of said polishing wheel.

7. In a device of the class described, a polishing wheel, a hood therefor, an inlet duct and an outlet duct, direct communication between the latter and said polishing wheel, and means providing communication between said inlet duct and said outlet duct.

8. In a device of the class described, a polishing wheel, a partial inclosure therefor, an exhaust duct adjacent thereto, a by-pass chamber adjacent to said exhaust duct which communicates with the atmosphere and shutters between said chamber and said duct for varying the flow of air from one to the other and for regulating the flow of air through said inclosure.

9. In a by-pass attachment for polishing wheels, the combination with an exhaust duct, of a fresh air chamber, a plurality of shutters between the two, a link secured to all of said shutters whereby they may be simultaneously adjusted, and means for securing said links in any position of adjustment.

10. In a device of the class described, a rectangular air duct, an exhaust pipe therein which decreases in diameter at successively increasing distances from the exhaust blower, suitable standards secured to said rectangular duct at opposite sides thereof, and motors each having a polishing wheel at opposite ends of its polishing shaft mounted on said standards at intervals along said duct, all of said polishing wheels communicating with said duct and pipe.

11. In combination, a polishing wheel, a pivoted apron, an exhaust pipe for drawing dust from said wheel and means connected with said apron for normally rendering said exhaust ineffective and for rendering said exhaust operative when the operator leans against said apron to move it.

12. In combination, a polishing wheel, an adjustable apron, an exhaust pipe for drawing dust from said wheel, an inclosure having shutters communicating with said exhaust pipe, means for simultaneously opening or closing said shutters, and connections between said apron and said means whereby said shutters are operated when said apron is adjusted.

13. In combination, a polishing wheel, a hood therefor, an exhaust pipe, a duct leading from said hood to said exhaust pipe, an apron movably mounted near the lower part of said wheel, a link secured thereto, a sector arranged to turn with said link, a cam on said sector, a rotatable rod and an arm thereon engaged by said cam, shutters arranged to establish communication with said duct whereby as said shutters are opened air is drawn through them into said exhaust pipe instead of being drawn from said hood, and connections between said rod and said shutters whereby the latter are operated by movement of said apron.

14. In a device of the class described, a polishing wheel, a hood therefor having a movable top, a support on which said top is pivoted, a partition within said hood also pivoted to said support, and means causing said hood to move with said partition when the latter is moved in one direction.

15. In a device of the class described, a polishing wheel, a hood therefor having a pivoted top, a pivoted partition within said hood, a deflector at the end of said top, and a projection within said top which engages said partition whereby said deflector is maintained out of engagement with said polishing wheel and whereby a passageway is maintained between said deflector and the upper wall of said top.

16. In a device of the class described, a polishing wheel, a hood therefor having an opening in front, an exhaust duct communicating with said hood below said opening to draw off the particles thrown downwardly by said wheel, and an auxiliary passage-way from said exhaust duct to the upper portion of said hood to draw off the particles carried around by said wheel before they are discharged through said opening, said upper portion being movable whereby it may be maintained sufficiently close to the periphery of said wheel to insure the necessary suction within said passage-way as said wheel wears away.

17. In a device of the class described, a polishing wheel, a hood therefor having an opening in front, an exhaust duct communicating with said hood below said opening to draw off the particles thrown downwardly by said wheel, an auxiliary passage-way from said exhaust duct to the upper portion of said hood to draw off the particles carried around by said wheel before they are discharged through said opening, said upper portion being pivoted, and means for adjusting said pivoted upper portion as the diameter of the wheel decreases, whereby it may be maintained close to the periphery of said wheel as the latter wears away.

18. In a device of the class described, a polishing wheel, a hood therefor having an opening in front, an exhaust duct communicating with said hood below said opening to draw off the particles thrown downwardly by said wheel, an auxiliary passage-way from said exhaust duct to the upper portion of said hood to draw off the particles carried around by said wheel before they are discharged through said opening, said upper portion being pivoted at its rear end, and means within said pivoted upper portion supporting it with its forward end in close proximity to the periphery of said wheel as the latter wears away.

19. In a device of the class described, a polishing wheel, a hood therefor having an opening in front, an exhaust duct communicating with said hood below said opening to draw off the particles thrown downwardly by said wheel, an auxiliary passage-way from said exhaust duct to the upper portion of said hood to draw off the particles carried around by said wheel before they are discharged through said opening, said upper portion being pivoted at its rear end, and a movable partition within said pivoted upper portion for supporting it with only a slight clearance between its forward end and the periphery of said wheel.

20. In a device of the class described, a polishing wheel, a hood therefor having an opening in front, an exhaust duct communicating with said hood below said opening to draw off the particles thrown downwardly by said wheel, said hood having a cap, a pivotal support for said cap, a partition in said cap and a second partition in said hood to the rear of said wheel forming a continuation of said first partition whereby an auxiliary passage is provided from said exhaust duct into said cap to draw off the particles carried around by said wheel before they are discharged through said opening.

21. In combination, a polishing wheel, a hood therefor having an opening in front and having a top section hinged near the rear whereby its front end may be moved down in close proximity to said wheel as the latter wears away, said end being adjacent to said opening, said hood having a rear wall closely following the curve of said wheel and having a pivoted upper extension fitting within said top section and providing two ducts therein having communication at the forward end thereof adjacent to said front end, and an exhaust duct communicating with the outer of said two ducts to draw off particles which follow around the periphery of said wheel into the inner of said two ducts, said front end serving to obstruct the discharge of said particles toward the operator and to prevent loss of suction.

22. In combination, a polishing wheel, a movable apron, an exhaust pipe for drawing dust from said wheel, and means connected with said apron for rendering said exhaust operative when said apron is moved toward said polishing wheel.

23. In combination, a polishing wheel, an adjustable apron, an exhaust pipe for drawing dust from said wheel, an inclosure having ports communicating with said exhaust pipe, means for simultaneously opening or closing said ports and operating connections between said apron and said means.

24. In a device of the class described, a polishing wheel, a hood therefor having a movable top, a movable partition within said hood, and means causing said hood to move with said partition when the latter is moved in one direction.

25. In a device of the class described, a rotatable polishing wheel, a hood therefor having an adjustable top, a motor for said polishing wheel, a rheostat for said motor, an indicator associated with said rheostat to enable the operator to adjust the latter to insure a predetermined peripheral speed of said polishing wheel, and means coöperating with said rheostat, indicator, and the periphery of said polishing wheel whereby the operator is prevented from adjusting said rheostat for a peripheral speed in excess of what is desired, said means serving also to adjust said top in accordance with the diameter of said wheel.

26. In a device of the class described, a rotatable polishing wheel, a hood therefor having an adjustable top, a motor for said polishing wheel, a rheostat for said motor, a spindle carrying the rheostat arm, a worm on said spindle, a gear coöperating with the said worm, a shaft carrying said gear, and an arm on said shaft arranged to move in the plane of said polishing wheel, said arm being arranged within said top and serving to maintain the latter at the desired distance from said polishing wheel.

27. In a device of the class described, a rotatable polishing wheel, a hood therefor having an adjustable top, a motor for said polishing wheel, a rheostat for said motor, an arm arranged to move in the plane of said polishing wheel, and mechanical connections between said rheostat and said arm, the latter being arranged within said top and serving to maintain it at the desired distance from said polishing wheel.

In witness whereof I hereunto subscribe my name this 4th day of November, A. D. 1916.

FREDERIC S. KOCHENDORFER.